United States Patent [19]

Bullock et al.

[11] 4,195,664
[45] Apr. 1, 1980

[54] SURGE-DAMPING VACUUM VALVE

[75] Inventors: Jack C. Bullock, Pleasanton; Benjamin E. Kelly, Tracy, both of Calif.

[73] Assignee: The United States of America as represented by the United States Department of Energy, Washington, D.C.

[21] Appl. No.: 872,285

[22] Filed: Jan. 25, 1978

[51] Int. Cl.² ............................................. F16K 17/30
[52] U.S. Cl. ................................. 137/613; 137/513.5; 137/517
[58] Field of Search .............. 1;37/513.3, 513.5, 513.7, 1;37/625.3, 625.33, 613, 614.2, 517

[56] References Cited

U.S. PATENT DOCUMENTS

| 834,855 | 10/1906 | Woodman et al. | 137/513.5 |
| 852,007 | 4/1907 | Wilson | 137/513.5 X |
| 920,716 | 5/1909 | Beckman | 137/513.3 |
| 1,764,181 | 6/1930 | Raetz et al. | 137/513.5 X |
| 3,247,867 | 4/1966 | Martin | 137/513.5 X |
| 3,431,028 | 3/1969 | Yoder | 137/513.5 X |
| 3,454,182 | 7/1969 | Morton | 137/513.5 X |

Primary Examiner—William R. Cline
Attorney, Agent, or Firm—R. V. Lupo; Roger S. Gaither; L. E. Carnahan

[57] ABSTRACT

A valve having a mechanism for damping out flow surges in a vacuum system which utilizes a slotted spring-loaded disk positioned adjacent the valve's vacuum port. Under flow surge conditions, the differential pressure forces the disk into sealing engagement with the vacuum port, thereby restricting the flow path to the slots in the disk damping out the flow surge.

4 Claims, 4 Drawing Figures

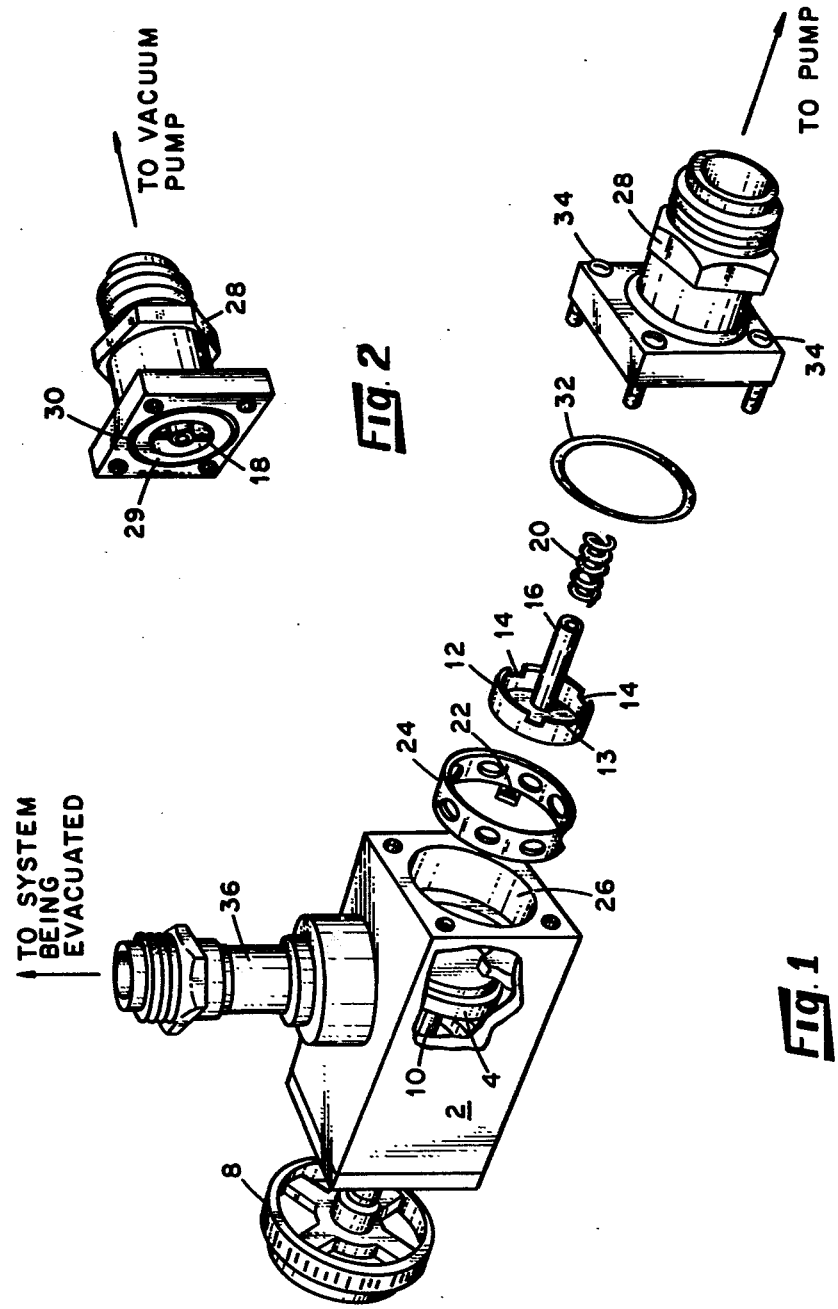

SURGE-DAMPING VACUUM VALVE

BACKGROUND OF THE INVENTION

The invention described herein was made at the Lawrence Livermore Laboratory in the course of, or under Contract No. W-7405- ENG-48 between the U.S. Energy Research and Development Administration (now the Department of Energy) and the University of California. The invention relates to vacuum systems, particularly to vacuum system control valves, and more particularly to a surge-damping vacuum valve.

Flow surges are a common ocurrence in vacuum systems. Such flow transients are undesirable mainly because they may disturb objects within the vacuum system. For example, when a glovebox is being evacuated, the operator must open the vacuum valve slowly and cautiously to prevent the initial air surge from distrubing materials within the box (sweeping powders out of open containers, etc.). Also, for systems requiring a constant vacuum pressure, any disruption of that constant pressure creates severe problems, thus requiring surge-damping.

SUMMARY OF THE INVENTION

The present invention is a vlave having a mechanism for automatically damping out flow surges in a vacuum system. Basically, the surge-damping mechanism consists of a disk having several slots in its periphery. A spring forces the disk to an open position. Upon flow surge the differential pressure overcomes the force of the spring and forces the disk into sealing engagement with the vacuum port, restricting flow to the slots in the rim of the disk, thus damping out the flow surge. When the pressure is equalized the spring moves the disk to open position.

Therefore, it is an object of the invention to provide means for damping out flow surges in a vacuum system.

A further object of the invention is to provide a surge-damping vacuum valve.

Another object of the invention is to provide a vacuum surge damping mechanism for a valve utilizing a differential pressure actuated, spring loaded, slotted disk which restricts flow under surge conditions.

Other objects of the invention will become readily apparent to those skilled in the art from the following description and accompanying drawings.

BRIEF DESCRIPTION OF THE DRAWINGS

FIG. 1 is an exploded view of the surge-damping vacuum valve of of the invention;

FIG. 2 illustrates the valve seat and spider components of the FIG. 1 valve;

DETAILED DESCRIPTION OF THE INVENTION

Figure 3:
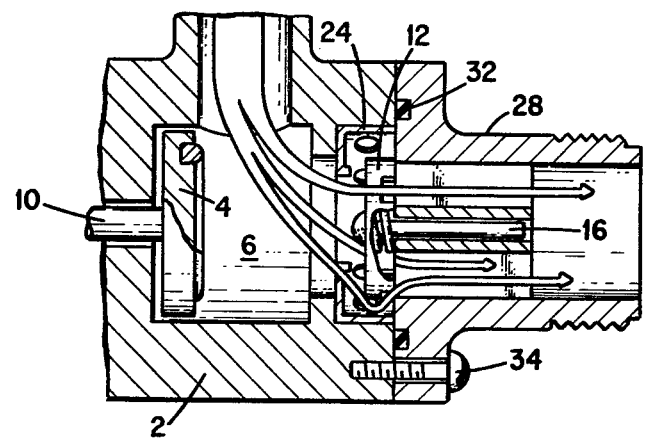
FIG. 3 illustrates the valve in actuated condition for damping flow surge.
Figure 4:
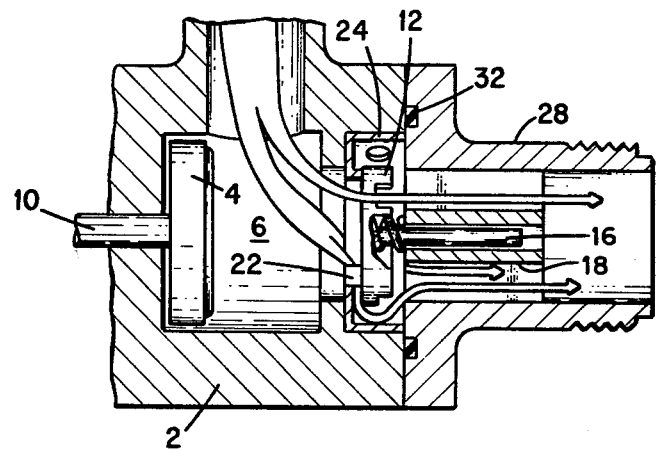
FIG. 4 illustrates the valve in normal operation of the vacuum flow system.

The invention is directed to a surge-damping mechanism in a vacuum control valve for automatically damping out flow surges in a vacuum system.

FIGS. 1 and 2 illustrate an embodiment of the invention wherein the surge-damping mechanism is incorporated in a vacuum control valve basically composed of a valve body or housing 2 having a flow control piston 4 located in a chamber 6 and controlled by mechanism 8 located externally of valve body 2 via a shaft 10. The surge-damping mechanism consists of a disk 12 having a rim or flange section 13 with plurality of narrow slots 14 on the periphery of the rim or flange section 13, disk 12 being integral with or secured to a shaft 16 which is movably positioned in and supported by a spider 18 (see FIG. 2), with a spring 20 on shaft 16 which forces disk 12 against tabs or stops 22 on a perforated collar 24 positioned within a vacuum port 26 of valve body 2. Spider 18 is supported within a fitting 28, with fitting 28 having a surface forming a seat 29 and a groove 30 (see FIG. 2) therein for an O-ring seal 32 and is secured to valve body 2 via screws 34. As indicated by legend, fitting 28 is adapted to be connected to a vacuum pump, while another fitting 36 secured to valve body 2 is adapted to be connected to a system being evacuated as indicated by legend.

FIG. 3 shows the valve surge-damping mechanism underflow surge conditions, such as the onset of vacuum pumping. The momentary pressure differential across the disk 12 overcomes the force of spring 20 and forces disk 12 into sealing engagement with seat 29 of fitting 28, thereby restricting flow to only through slots 14 in the rim of flange section 13. This increased flow resistance damps out the flow surge. When the pressure equalizes across disk 12, spring 20 forces disk 12 out of engagement with seat 29 of fitting 28 and in contact with tabs or stops 22 of collar 24, thereby restoring full flow conductance through the valve as shown in FIG. 3.

It has thus been shown that the present invention provides a surge-damping mechanism for a vacuum control valve which effectively damps out flow surges in a vacuum system, thus overcoming the problems associated with flow surges in such a system.

While a particular embodiment of the invention has been illustrated and described, modifications will become apparent to those skilled in the art, and it is intended to cover in the appended claims all such modifications as come within the spirit and scope of the invention.

What we claim is:

1. A vacuum control valve having a valve body defining a chamber therein and provided with a pair of ports connected to said chamber, means including a movable member positioned in said chamber for controlling flow through said chamber, and a surge-damping mechanism positioned in said chamber in spaced relationship with respect to said movable member, said surge-damping mechanism comprising: a collar positioned in one of the ports of said valve body and having a plurality of inwardly extending tab members, a disk movably poistioned in said collar and having a radially extending body portion and a flange about the periphery of said body portion and extending substantially perpendicular thereto, said flange of said disk having a plurality of slots around the periphery thereof, said disk being connected to one end of a shaft, said shaft being supported in a spider mounted within a fitting connected to said valve body and adapted to be connected to an associated vacuum pump, said fitting having a surface forming a seat for said flange of said disk, and spring means positioned between said spider and said disk whereby differential pressure across said disk caused by a flow surge condition forces said disk against said spring such that said flange contacts said seat thereby restricting flow through said one port except through said slots in said disk which damps out the flow surge, and upon pressure equalization across said disk said spring forces said disk to move within said collar into contact with said tab members of said collar allowing unrestricted flow through said one port.

2. The improvement defined in claim 1, additionally including seal means positioned about said surface and intermediate said valve body and said fitting for preventing leakage therebetween.

3. The improvement defined in claim 1, wherein said flange of said disk is of a substantially annular configuration having one end thereof secured to said radially extending body portion of said disk and constructed such that an opposite end of said annular flange contacts said seat during a flow surge condition.

4. The improvement defined in claim 3, wherein said surface of said fitting forming said seat is substantially perpendicular with respect to an outer rim of said opposite end of said annular flange of said disk, and wherein said fitting is provided with a groove extending around said surface and provided with a seal therein for preventing leakage between said valve body and said fitting.

* * * * *